(12) United States Patent
Horiguchi et al.

(10) Patent No.: US 10,376,899 B2
(45) Date of Patent: Aug. 13, 2019

(54) MAGNETIC-MATTER REMOVING APPARATUS AND MAGNETIC-MATTER REMOVING METHOD

(71) Applicant: PRIMETALS TECHNOLOGIES JAPAN, LTD., Tokyo (JP)

(72) Inventors: Akira Horiguchi, Hiroshima (JP); Norihiko Ikenaga, Hiroshima (JP); Hirofumi Honda, Hiroshima (JP)

(73) Assignee: PRIMETALS TECHNOLOGIES JAPAN, LTD., Tokyo (JP)

( * ) Notice: Subject to any disclaimer, the term of this patent is extended or adjusted under 35 U.S.C. 154(b) by 182 days.

(21) Appl. No.: 15/061,660

(22) Filed: Mar. 4, 2016

(65) Prior Publication Data
US 2016/0271621 A1 Sep. 22, 2016

(30) Foreign Application Priority Data
Mar. 19, 2015 (JP) ................................. 2015-055765

(51) Int. Cl.
*B03C 1/12* (2006.01)
*B03C 1/18* (2006.01)
*B03C 1/033* (2006.01)

(52) U.S. Cl.
CPC .............. *B03C 1/12* (2013.01); *B03C 1/0332* (2013.01); *B03C 1/18* (2013.01); *B03C 2201/18* (2013.01); *Y02P 70/171* (2015.11)

(58) Field of Classification Search
None
See application file for complete search history.

(56) References Cited

U.S. PATENT DOCUMENTS

| | | | | | |
|---|---|---|---|---|---|
| 3,357,559 | A | * | 12/1967 | Israelson ................... | B03C 1/20 198/690.1 |
| 3,581,872 | A | * | 6/1971 | Grossjohann ........ | B65G 17/323 198/472.1 |
| 4,209,403 | A | * | 6/1980 | Dorgathen ................ | B03C 1/20 210/222 |

FOREIGN PATENT DOCUMENTS

| | | | |
|---|---|---|---|
| EP | 2669391 A1 * | 12/2013 | ............... C22B 7/04 |
| JP | 51-48774 U1 | 4/1976 | |
| JP | 5-111645 A | 5/1993 | |

(Continued)

OTHER PUBLICATIONS

Bogdanov, "Machine Translation of RU 2116115", published 1998, 6 total pages.*

(Continued)

*Primary Examiner* — Jonathan M Peo
(74) *Attorney, Agent, or Firm* — Birch, Stewart, Kolasch & Birch, LLP (57) ABSTRACT

A magnetic-matter removing apparatus includes: endless chains arranged to run in circles between inside liquid containing a magnetic matter and above the liquid; magnetic-matter attracting means supported on the endless chains for attracting the magnetic matter in the liquid with a magnetic force; a drum arranged above the liquid, having a magnetic force stronger than the magnetic force of the magnetic-matter attracting means, and configured to detach the magnetic matter attracted to the magnetic-matter attracting means from the magnetic-matter attracting means and attract the magnetic matter; and discharging means for scraping the magnetic matter attracted to the drum and discharging the magnetic matter to outside the apparatus.

15 Claims, 8 Drawing Sheets

(56) References Cited

FOREIGN PATENT DOCUMENTS

| | | |
|---|---|---|
| JP | 7-136894 A | 5/1995 |
| JP | 9-183037 A | 7/1997 |
| JP | 3323933 B2 | 9/2002 |
| JP | 2013-202536 A | 10/2013 |
| RU | 2 116 114 C1 | 7/1998 |
| RU | 2 116 115 C1 | 7/1998 |

OTHER PUBLICATIONS

Bogdanov, "Machine Translation of RU 2116114", published 1998, 11 total pages.*
Office Action dated Mar. 24, 2017 in corresponding Chinese Application No. 201610157274.0 with an English Translation.
Office Action dated Jul. 26, 2017 in the corresponding Korean Application No. 10-2016-0031950 with an English Translation.

* cited by examiner

MAGNETIC-MATTER REMOVING APPARATUS AND MAGNETIC-MATTER REMOVING METHOD

TECHNICAL FIELD

The present invention relates to a magnetic-matter removing apparatus and a magnetic-matter removing method.

BACKGROUND ART

Working fluid is used in a steel working line as represented by a steel rolling line, and iron powder, which is a magnetic matter, is present in this working fluid in a large amount as a contaminant. The working fluid is used in a large amount in the line and this large amount of working fluid used in the line will be used again in the line after the magnetic matter is removed. That is, the working fluid is circulated and used in the line.

Meanwhile, in the line, the concentration of the magnetic matter in the working fluid is kept at or below a predetermined value to maintain a certain level of steel workability and thus ensure a certain level of product quality. In a conventional practice, a magnetic matter above a predetermined particle size (e.g. a diameter of 50 μm) is removed from the working fluid by processing the working fluid with a filter. Further, a magnetic matter in the form of fine particles with the predetermined particle size and below is removed from this filtered working fluid by processing the working fluid with a magnetic-matter removing apparatus using magnets.

For example, Patent Literature 1 discloses an apparatus for removing iron scum in rolling oil in which: a chain conveyor equipped with magnet plates configured to attract iron scum is provided in such a way as to move the magnet plates in the rolling oil stored in a rolling oil tank and also obliquely pass the magnet plates through the surface of the rolling oil; and a scraper configured to scrape the iron scum attracted to the magnet plates is provided outside the rolling oil tank.

CITATION LIST

Patent Literature

{Patent Literature 1}
Japanese Patent No. 3323933

SUMMARY OF INVENTION

Technical Problem

However, the above apparatus for removing the iron scum in the rolling oil has a problem in that the scraper also scrapes the rolling oil adhering to the magnet plates and the rolling oil is hence removed along with the iron scum. In particular, in the case of the steel working line mentioned above, the working fluid is used in a large amount and there has therefore been a strong demand to efficiently remove the magnetic matter in the working fluid from the working fluid.

In view of the above, the present invention has been made to solve the above problem and an object thereof is to provide a magnetic-matter removing apparatus and a magnetic-matter removing method capable of efficiently removing a magnetic matter in liquid from the liquid.

Solution to Problem

A magnetic-matter removing apparatus according to the present invention for solving the above problem is a magnetic-matter removing apparatus for removing a magnetic matter from liquid, which contains the magnetic matter, including: attracting means for attracting the magnetic matter with a magnetic force; transporting means for transporting the attracting means in circles between inside the liquid and above the liquid; a drum arranged above the liquid, having a magnetic force stronger than the magnetic force of the attracting means, and configured to detach the magnetic matter attracted on the attracting means from the attracting means and attract the magnetic matter; discharging means for scraping the magnetic matter attracted to the drum and discharging the magnetic matter to outside the apparatus; and driving means for driving the transporting means and the drum.

A magnetic-matter removing method according to the present invention for solving the above problem is a magnetic-matter removing method for removing a magnetic matter from liquid, which contains the magnetic matter, including: attracting the magnetic matter with a magnetic force from attracting means; transporting the attracting means in circles between inside the liquid and above the liquid with transporting means; detaching the magnetic matter attracted to the attracting means from the attracting means and attracting the magnetic matter with a drum arranged above the liquid and having a magnetic force stronger than the magnetic force of the attracting means; and scraping the magnetic matter attracted to the drum and discharging the magnetic matter to outside an apparatus with discharging means.

Advantageous Effect of Invention

With the present invention, it is possible to efficiently remove a magnetic matter in liquid from the liquid.

DESCRIPTION OF EMBODIMENTS

Embodiments of a magnetic-matter removing apparatus and a magnetic-matter removing method according to the present invention will be explained below. However, the present invention is not limited solely to the following embodiments to be explained with reference to the drawings.

First Embodiment

A magnetic-matter removing apparatus according to a first embodiment of the present invention will be explained with reference to FIGS. 1A and 1B.

Figure 1A:
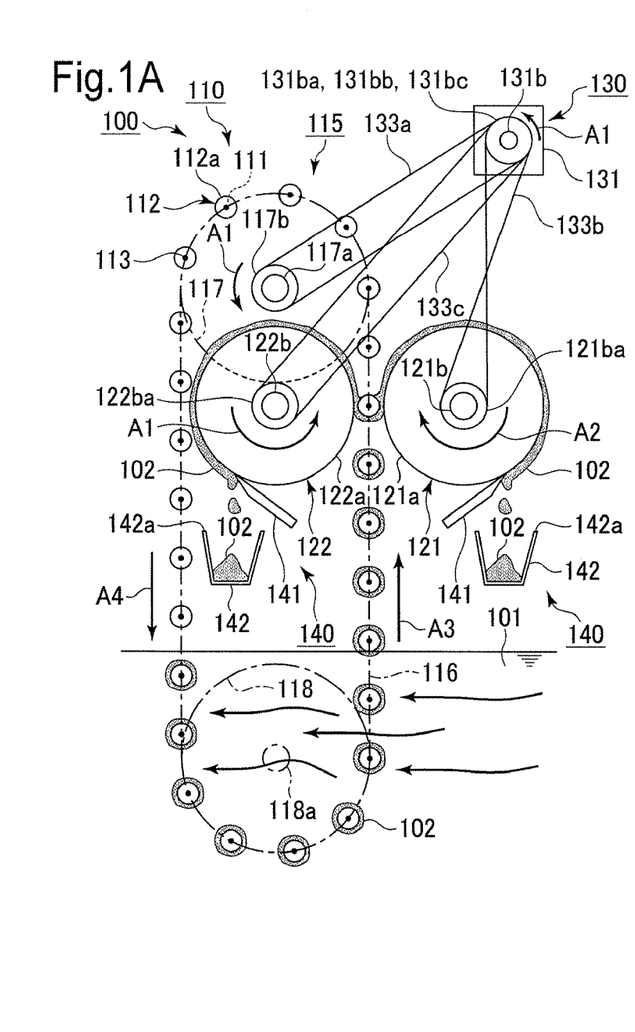
FIGS. 1A and 1B are schematic views showing a magnetic-matter removing apparatus according to a first embodiment of the present invention, FIG. 1A showing a front view of the magnetic-matter removing apparatus, FIG. 1B showing a side view of the magnetic-matter removing apparatus.
Figure 1B:
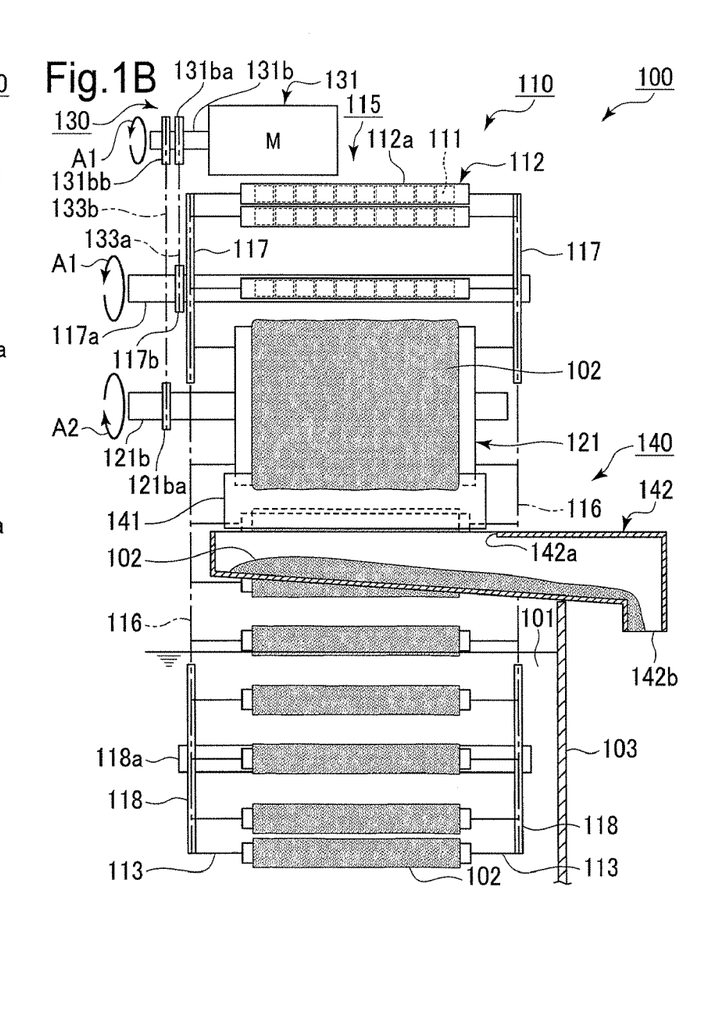

As shown in FIGS. 1A and 1B, a magnetic-matter removing apparatus 100 according to this embodiment is an apparatus for removing a magnetic matter 102 from liquid 101, which contains the magnetic matter 102, and includes a magnetic-matter attracting instrument 110, a transporting device 115, a pair of left and right drums 121, 122, a magnetic-matter discharging device 140, and a driving device 130. Note that the liquid 101 is flowing inside a tank 103 since it is used again in a line after the magnetic matter 102 is removed.

The liquid 101 is a working fluid for use in a steel working line or the like, and examples thereof include a liquid from which a magnetic matter such as iron powder above a predetermined particle size (e.g. a diameter of 50 μm) has been removed by processing the liquid with a filter. Examples of the magnetic matter 102 include iron powder in the form of fine particles with the predetermined particle size and below.

The transporting device 115 is an instrument configured to transfer a plurality of pipes 112 included in the magnetic-matter attracting instrument 110 in circles between inside the liquid 101 and above the liquid 101. The transporting device 115 includes endless chains 116 on which the plurality of pipes 112 are each supported by supporting means 113. The endless chains 116 are arranged on the front and rear sides, and each endless chain 116 is in a continuously annular shape. The pair of front and rear endless chains 116 are preferably arranged in parallel to each other. The supporting means 113 is an instrument capable of being supported on an end portion (e.g. radially center portion) of the pipe 112 and the corresponding endless chain 116, and a wire or the like can be used, for example. The axes of the plurality of pipes 112 are preferably arranged horizontally and in parallel to each other by means of the supporting means 113. The pair of front and rear endless chains 116 are laid on a pair of front and rear lower sprockets 118 arranged in the liquid 101 and a pair of front and rear upper sprockets 117 arranged above the liquid 101. The diameter of the pair of front and rear lower sprockets 118 and the diameter of the pair of front and rear upper sprockets 117 are preferably approximately equal to each other. A shaft portion 118a of the pair of front and rear lower sprockets 118 and a shaft portion 117a of the pair of front and rear upper sprockets 117b is fixed to the shaft portion 117a of the pair of front and rear upper sprockets 117.

The magnetic-matter attracting instrument 110 is an instrument configured to attract the magnetic matter 102 with a magnetic force. The magnetic-matter attracting instrument 110 includes the plurality of pipes 112, which are supported on the pair of front and rear endless chains 116 by the supporting means 113, and a plurality of permanent magnets 111 arranged in the plurality of pipes 112. Note that both end portions of each pipe 112 are closed. The shape of the pipe 112 is not limited to a circular shape, a polygonal shape, or the like but is preferably a circular cylinder shape. This is because a magnetic force can be generated equally over an entire peripheral surface 112a of the pipe 112 in the circumferential direction, which allows uniform attraction of the magnetic matter 102.

The plurality of permanent magnets 111 are arranged adjacently to each other in the longitudinal direction of the pipe 112 such that magnetic fields are generated on the peripheral surface 112a side of the pipe 112. The permanent magnets 111 have such a magnetic force as to be capable of attracting fine (e.g. diameters of 50 μm and below) iron powder.

The left drum 122 is arranged above the liquid 101 between the pair of front and rear upper sprockets 117 and the pair of front and rear lower sprockets 118 in a region surrounded by the paths of movement of the pair of front and rear endless chains 116. The right drum 121 is arranged outside the region surrounded by the paths of movement of the pair of front and rear endless chains 116. The right drum 121 is preferably arranged at the same height level as the left drum 122 and the axes of the drums 121, 122 are preferably arranged horizontally and in parallel to each other. This is because the peripheral surface 112a of each pipe 112 can be face peripheral surfaces 121a, 122a of the drums 121, 122 when the pipe 112 is moved through the gap between the drums 121, 122 by the pair of front and rear endless chains 116.

Meanwhile, the left drum 122 and the right drum 121 are preferably arranged such that each pipe 112 with the magnetic matter 102 attracted to its peripheral surface 112a can be moved through the gap between them. Further, the left drum 122 and the right drum 121 are preferably arranged such that the magnetic matter 102 attracted to the peripheral surface 112a of the pipe 112 can be detached from the peripheral surface 112a and attracted onto the peripheral surfaces 121a, 122a of the drums 121, 122 by magnetic forces from the drums 121, 122.

The drums 121, 122 are permanent magnets configured to generate magnetic fields on the peripheral surface 121a, 122a sides. The drums 121, 122 each have a magnetic force greater than that of the permanent magnets 111. The drums 121, 122 each have such a magnetic force that the magnetic matter 102 attracted to the peripheral surface 112a of the pipe 112 by the permanent magnets 111 can be detached from the peripheral surface 112a of the pipe 112 and attracted onto the peripheral surface 121a, 122a of the drum 121, 122. Here, driving sprockets 121ba, 122ba are fixed to shaft portions 121b, 122b of the drums 121, 122, respectively.

The magnetic-matter discharging device 140 includes scrapers 141 and magnetic matter receivers 142. The scrapers 141 are instruments configured to scrape the magnetic matter 102 attracted to the peripheral surfaces 121a, 122a of the drums 121, 122 by the magnetic forces of the drums 121, 122. One scraper 141 is arranged on the lower side of each of the drums 121, 122.

One magnetic matter receiver 142 is arranged under the scraper 141 for the drum 121 and one magnetic matter receiver 142 is arranged under the scraper 141 for the drum 122. These magnetic matter receivers 142 are shaped to extend under the drums 121, 122 to outside the tank 103 (outside the apparatus). Each magnetic matter receiver 142 includes an opening portion 142a and a discharge portion 142b. The opening portion 142a is provided under the spot where the peripheral surface 121a, 122a of the drum 121, 122 and the scraper 141 come into contact with each other. The discharge portion 142b is provided outside the tank 103. The magnetic matter 102 is scraped by the scraper 141 from the drum 121, 122 and introduced into the magnetic matter receiver 142 through the opening portion 142a. The magnetic matter receiver 142 has its bottom plate inclined toward the discharge portion 142b from under the drum 121, 122 so that the magnetic matter 102 can be discharged toward the discharge portion 142b.

The driving device 130 is a device configured to rotationally drive the pair of front and rear upper sprockets 117 of the transporting device 115 and the pair of left and right drums 121, 122. The driving device 130 includes a driving motor 131. Driving sprockets 131ba, 131bb, 131bc are fixed to an output shaft 131b of the driving motor 131. A driving endless chain 133a is laid on the driving sprocket 131ba and the driving sprocket 117b of the transporting device 115. A driving endless chain 133b, which crosses at the middle, is laid on the driving sprocket 131bb and the driving sprocket 121ba of the right drum 121. A driving endless chain 133c is laid on the driving sprocket 131bc and the driving sprocket 122ba of the left drum 122.

Thus, when the output shaft 131b of the driving motor 131 of the driving device 130 is rotationally driven in the direction of arrow A1, the pair of front and rear upper sprockets 117 and the left drum 122 are synchronously rotated in the direction of arrows A1 through the driving endless chains 133a, 133c whereas the right drum 121 is synchronously rotated in the direction of an arrow A2 opposite the arrows A1 through the driving endless chain 133b. The endless chains 116 and the plurality of pipes 112 are moved in an ascending direction indicated by an arrow A3 between the pair of left and right drums 121, 122 and moved in a descending direction indicated by an arrow A4 toward the pair of front and rear lower sprockets 118 after passing the pair of front and rear upper sprockets 117. In other words, the endless chains 116 and the plurality of pipes 112 are moved in circles between the sprockets 117, 118. Also, the pair of left and right drums 121, 122 are rotated such that the mutually facing sides of the peripheral surfaces 121a, 122a move upward.

Now, the operation of the magnetic-matter removing apparatus 100 with the above structure will be explained.

When the driving motor 131 of the driving device 130 is driven, thereby rotating the output shaft 131b, the pair of front and rear upper sprockets 117 and the pair of left and right drums 121, 122 are synchronously rotated through the driving sprockets 131ba, 131bb, 131bc, which are fixed to the output shaft 131b, the driving endless chains 133a, 133b, 133c, and the driving sprockets 117b, 121ba, 122ba.

By the rotation of the pair of front and rear upper sprockets 117, the pair of front and rear endless chains 116 are moved upward between the drums 121, 122 and moved downward after passing the pair of front and rear upper sprockets 117.

Specifically, the pair of front and rear endless chains 116 are moved between the upper sprockets 117 and the lower sprockets 118 as follows. The pair of front and rear endless chains 116 are lowered from the upper sprockets 117 along the left side of the left drum 122 and, once entering the liquid 101 and reaching the lower sprockets 118, guided by the lower sprockets 118 to a position under the gap between the drums 121, 122. From this position, the pair of front and rear endless chains 116 are pulled up out of the liquid 101 and passed through the gap between the drums 121, 122 and, once reaching the upper sprockets 117, guided by the upper sprockets 117 to the left side of the left drum 122.

The endless chains 116 which are moved as above support the plurality of pipes 112 arranged adjacently to each other in the direction of the movement, and the pipes 112 are moved similarly to the endless chains 116. Inside the liquid 101, a magnetic force is exerted from the incorporated permanent magnets 111, thereby attracting the magnetic matter 102 in the liquid 101 onto the peripheral surfaces 112a of the pipes 112. When each pipe 112 with the magnetic matter 102 attracted to its peripheral surface 112a is pulled up out of the liquid 101 and reaches the gap between the drums 121, 122, the magnetic matter 102 attracted to the peripheral surface 112a of the pipe 112 is detached from the peripheral surface 112a of the pipe 112 and attracted onto the peripheral surfaces 121a, 122a of the drums 121, 122 since the magnetic force of each of the drums 121, 122 is stronger than the magnetic force of the plurality of permanent magnets 111 incorporated in the pipe 112 (because of the difference in magnetic force between the drums 121, 122 and the plurality of permanent magnets 111). Here, when the pipe 112 is raised, the drums 121, 122 are rotated, so that the magnetic matter 102 is attracted onto spots on the peripheral surfaces 121a, 122a of the drums 121, 122 on which no magnetic matter is attracted.

The pipe 112 now without the magnetic matter 102, which has been attracted to its peripheral surface 112a but moved onto the peripheral surfaces 121a, 122a of the drums 121, 122 from the peripheral surface 112a, is further raised and then guided by the sprockets 117, 118 and the endless chains 116 to be lowered again along the left side of the left drum 122 into the liquid 101 and attract the magnetic matter 102 in the liquid 101. The pipe 112 having attracted the magnetic matter 102 is then guided to the gap between the drums 121, 122 by the sprockets 117, 118 and the endless chains 116. Thus, the plurality of pipes 112, the transporting device 115, and the drums 121, 122 continuously perform the attraction of the magnetic matter 102 in the liquid 101 and the transfer of the magnetic matter 102 attracted to the pipes 112 onto the drums 121, 122.

The magnetic matter 102 attracted to the peripheral surfaces 121a, 122a of the drums 121, 122 is moved in the directions of rotation of the drums 121, 122 and scraped by the scrapers 141 from the peripheral surfaces 121a, 122a of the drums 121, 122. The magnetic matter 102 is then introduced into the magnetic matter receivers 142 from the opening portions 142a and discharged through the discharge portions 142b to outside the tank 103 (outside the apparatus).

Thus, according to this embodiment, the magnetic matter 102 in the liquid 101 is attracted onto the magnetic-matter attracting instrument 110 with its magnetic force. Further, the magnetic matter 102 attracted to the magnetic-matter attracting instrument 110 is detached from the magnetic-matter attracting instrument 110 and attracted onto the drums 121, 122 with the magnetic forces of the drums 121, 122. The magnetic matter 102 attracted to the drums 121, 122 is then discharged to outside the tank 103 (outside the apparatus) by the magnetic-matter discharging device 140. In this way, the liquid 101 discharged along with the magnetic matter 102 can be reduced and the magnetic matter 102 in the liquid 101 can be accordingly efficiently removed from the liquid 101 as compared to the case where a magnetic matter in liquid is discharged by magnetic-matter discharging means to outside a tank directly from attracting means.

Also, the magnetic matter 102 can be efficiently removed from the liquid 101 with the small and simple structure of the magnetic-matter removing apparatus 100 which includes the magnetic-matter attracting instrument 110, the transporting device 115, the pair of left and right drums 121, 122, the magnetic-matter discharging device 140, and the driving device 130.

The transporting device 115 includes the two endless chains 116, and the magnetic-matter attracting instrument 110 includes the pipes 112 supported on the two endless chains 116 and the permanent magnets 111 arranged in the pipes 112. In this way, the magnetic matter 102 can be attracted utilizing the entire peripheral surface 112a of each pipe 112 and the magnetic matter 102 can be efficiently removed from the liquid 101 as compared to the case of using flat plate members.

If the axes of the plurality of pipes 112 and the drums 121, 122 are arranged horizontally and in parallel to each other, the spot where each pipe 112 and the drums 121, 122 face each other is wide as compared to a case where the axes are inclined with respect to each other. Thus, the magnetic matter 102 attracted to the peripheral surface 112a of the pipe 112 can be more efficiently transferred onto the peripheral surfaces 121a, 122a of the drums 121, 122.

The pair of front and rear endless chains 116 are laid on the pair of front and rear lower sprockets 118 arranged in the liquid 101 and the pair of front and rear upper sprockets 117 arranged above the liquid 101. In this way, the plurality of pipes 112 can be transported through a predetermined transport path and the magnetic matter 102 attracted to the peripheral surfaces 112a of the plurality of pipes 112 can be more certainly transported onto the peripheral surfaces 121a, 122a of the drums 121, 122.

The upper sprockets 117 and the drums 121, 122 can be rotationally driven with the one driving motor 131 included in the driving device 130. In this way, the apparatus can be downsized.

Further, the positions to arrange the pair of front and rear lower sprockets 118 and the lengths of the endless chains 116 can be adjusted in accordance with the size of the tank 103. In this way, the magnetic matter 102 in the liquid 101 can be efficiently removed.

The efficiency of removal of the magnetic matter 102 can be adjusted by adjusting the number of pipes 112, i.e., the number of permanent magnets 111, and the speeds of movement of the endless chains 116. Alternatively, the efficiency of removal of the magnetic matter 102 can be adjusted also by adjusting the diameters of the drums 121, 122, the diameters of the pipes 112, and the speeds of rotation of the drums 121, 122.

Second Embodiment

A magnetic-matter removing apparatus according to a second embodiment of the present invention will be explained with reference to FIGS. 2A and 2B.

This embodiment involves a structure obtained by changing the pair of left and right drums included in the first embodiment explained above and shown in FIGS. 1A and 1B. The other features of the structure are substantially the same as those of the apparatus explained above and shown in FIGS. 1A and 1B, and the same components will be denoted by the same reference signs and overlapping explanation will be omitted when appropriate.

Figure 2A:
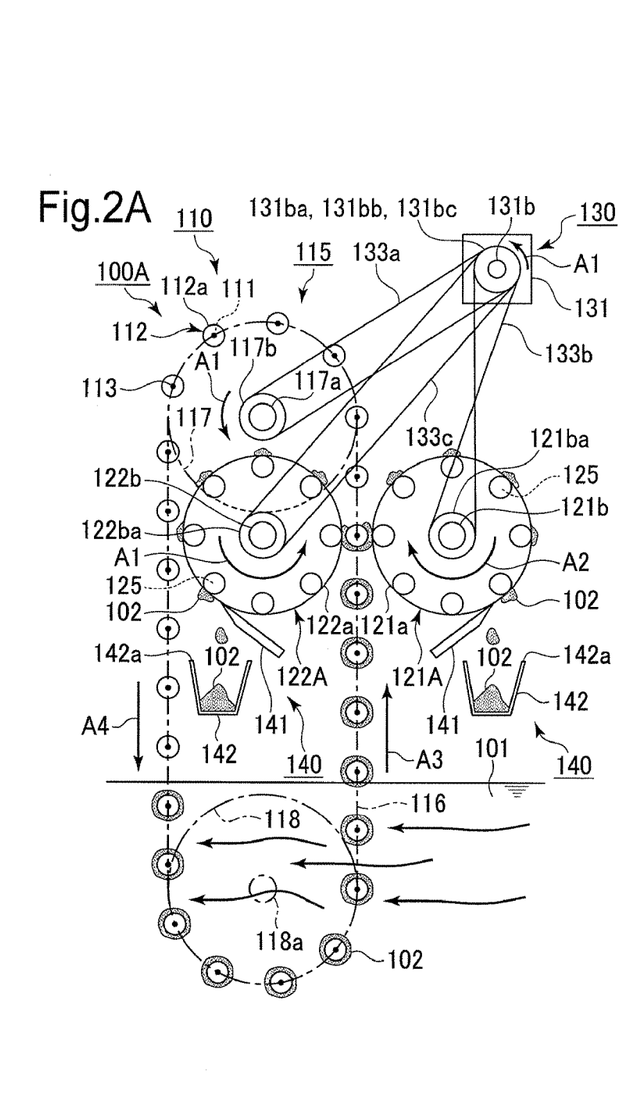
FIGS. 2A and 2B are schematic views showing a magnetic-matter removing apparatus according to a second embodiment of the present invention, FIG. 2A showing a front view of the magnetic-matter removing apparatus, FIG. 2B showing a side view of the magnetic-matter removing apparatus.
Figure 2B:
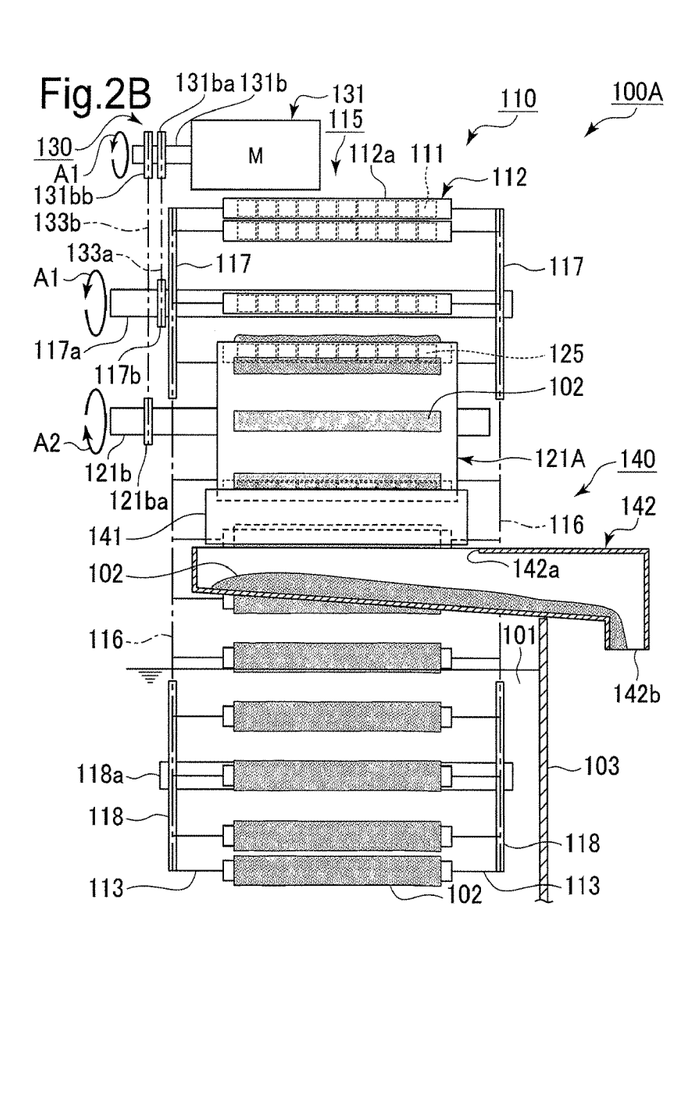

As shown in FIGS. 2A and 2B, a magnetic-matter removing apparatus 100A according to this embodiment is an apparatus for removing a magnetic matter 102 from liquid 101, which contains the magnetic matter 102, and includes a magnetic-matter attracting instrument 110, a transporting device 115, a pair of left and right drums 121A, 122A, a magnetic-matter discharging device 140, and a driving device 130.

The pair of left and right drums 121A, 122A are nonmagnetic bodies and each of the drums 121A, 122A includes sets of a plurality of permanent magnets 125 therein.

The plurality of permanent magnets 125 are arranged to generate a magnetic field on a peripheral surface 121a, 122a side of the drum 121A, 122A. The plurality of permanent magnets 125 have a magnetic force greater than that of permanent magnets 111. The permanent magnets 125 have such a magnetic force that the magnetic matter 102 attracted to a peripheral surface 112a of a pipe 112 by its permanent magnets 111 can be detached from the peripheral surface 112a of the pipe 112 and attracted onto the peripheral surface 121a, 122a of the drum 121A, 122A. The plurality of permanent magnets 125 are arranged in the drums 121A, 122A to face the pipe 112 at the gap between the drums 121A, 122A when sprockets 117 and the drums 121A, 122A are synchronously rotated. In this way, the magnetic matter 102 can be certainly transferred from the peripheral surface 112a of the pipe 112 onto the peripheral surfaces 121a, 122a of the drums 121A, 122A.

Now, the operation of the magnetic-matter removing apparatus 100A with the above structure will be explained.

When a driving motor 131 of the driving device 130 is driven, thereby rotating an output shaft 131b, the pair of front and rear upper sprockets 117 and the pair of left and right drums 121A, 122A are synchronously rotated through driving sprockets 131ba, 131bb, 131bc fixed to the output shaft 131b, driving endless chains 133a, 133b, 133c, and driving sprockets 117b, 121ba, 122ba. In the liquid 101, the plurality of pipes 112 attract the magnetic matter 102, and are then raised out of the liquid 101 by endless chains 116 and guided to the gap between the pair of left and right drums 121A, 122A.

At the gap between the drums 121A, 122A, the permanent magnets 125 arranged in the drums 121A, 122A face each of these pipes 112. The magnetic matter 102 attracted to the peripheral surface 112a of the pipe 112 is detached from the peripheral surface 112a of the pipe 112 and attracted onto the peripheral surfaces 121a, 122a of the drums 121A, 122A since the magnetic force of the permanent magnets 125 is stronger than the magnetic force of the plurality of permanent magnets 111 incorporated in the pipe 112 (because of the difference in magnetic force between the plurality of permanent magnets 125 and the plurality of permanent magnets 111).

The magnetic matter 102 attracted to the peripheral surfaces 121a, 122a of the drums 121A, 122A is moved in the directions of rotation of the drums 121A, 122A and scraped by scrapers 141 from the peripheral surfaces 121a, 122a of the drums 121A, 122A. The magnetic matter 102 is then introduced into magnetic matter receivers 142 from opening portions 142a and discharged through discharge portions 142b to outside a tank 103 (outside the apparatus).

Thus, according to this embodiment, as compared to the case where the drums themselves are permanent magnets, the amount of permanent magnets used can be reduced and the cost of the apparatus can be accordingly reduced. The maintainability can be improved since it is also possible to replace only the permanent magnets 125 incorporated in the drums 121A, 122A.

By the rotation of the drums 121A, 122A, the tips of the scrapers 141 alternately contact a spot with a strong magnetic force and a spot with a weak magnetic force. Thus, the scrapers 141 can efficiently scrape the magnetic matter 102 attracted to the peripheral surfaces 121a, 122a of the drums 121A, 122A as compared to the case where they contact only a spot with a strong magnetic force.

Third Embodiment

A magnetic-matter removing apparatus according to a third embodiment of the present invention will be explained with reference to FIGS. 3A and 3B.

This embodiment involves a structure obtained by changing the transporting device included in the second embodiment explained above and shown in FIGS. 2A and 2B. The other features of the structure are substantially the same as those of the apparatus explained above and shown in FIGS. 2A and 2B, and the same components will be denoted by the same reference signs and overlapping explanation will be omitted when appropriate.

Figure 3A:
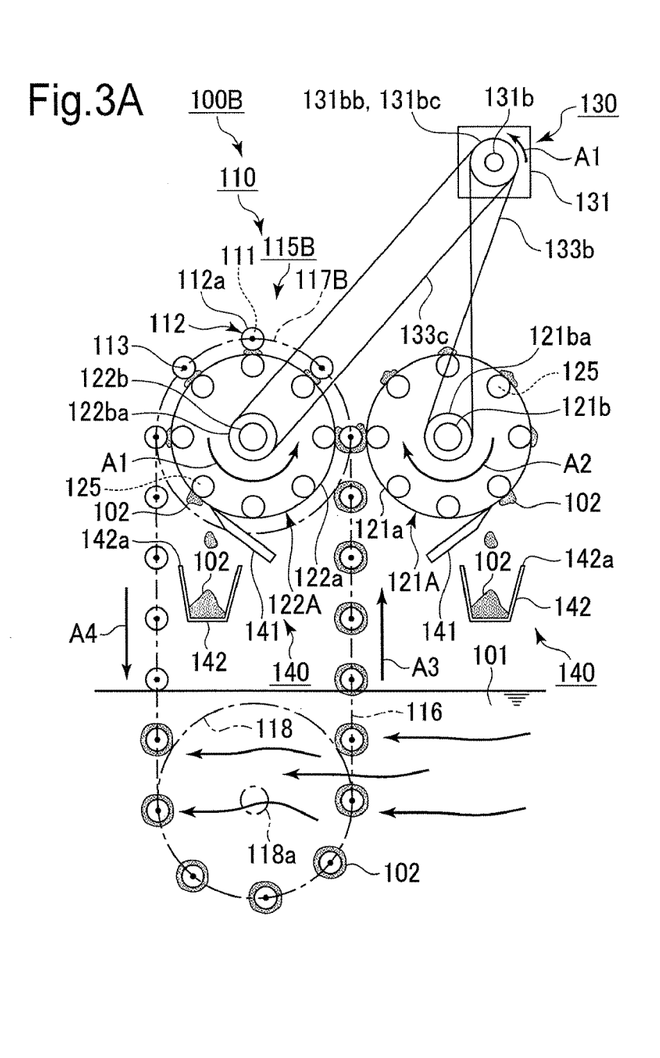
FIGS. 3A and 3B are schematic views showing a magnetic-matter removing apparatus according to a third embodiment of the present invention, FIG. 3A showing a front view of the magnetic-matter removing apparatus, FIG. 3B showing a side view of the magnetic-matter removing apparatus.
Figure 3B:
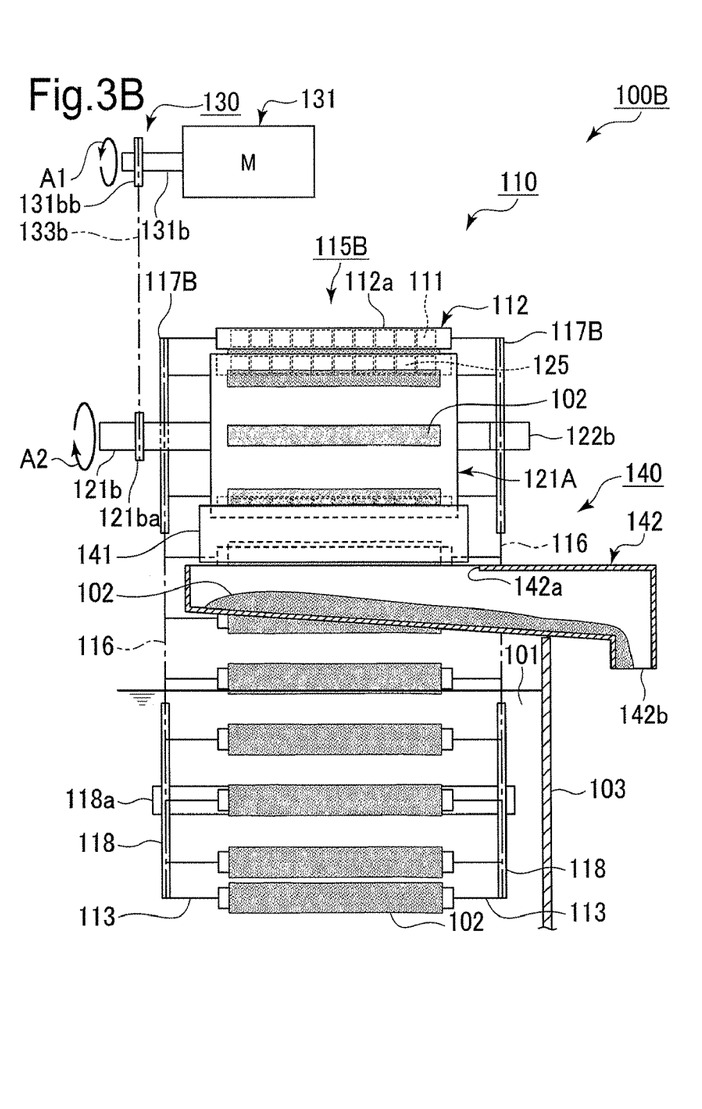

As shown in FIGS. 3A and 3B, a magnetic-matter removing apparatus 100B according to this embodiment is an apparatus for removing a magnetic matter 102 from liquid 101, which contains the magnetic matter 102, and includes a magnetic-matter attracting instrument 110, a transporting device 115B, a pair of left and right drums 121A, 122A, a magnetic-matter discharging device 140, and a driving device 130.

The transporting device 115B includes a pair of front and rear lower sprockets 118. Also, the transporting device 115B includes a pair of front and rear upper sprockets 117B fixed to a shaft portion 122b of the left drum 122A in place of the pair of front and rear upper sprockets 117 included in the transporting device 115 mentioned above. A shaft portion 118a of the pair of front and rear lower sprockets 118 is preferably arranged in parallel to the shaft portion 122b of the left drum 122A. A pair of front and rear endless chains 116 are laid on the pair of front and rear lower sprockets 118 and the pair of front and rear upper sprockets 117B.

Thus, when an output shaft 131b of a driving motor 131 is rotationally driven in the direction of an arrow A1, the pair of front and rear upper sprockets 117B and the left drum 122A are synchronously rotated in the direction of an arrow A1 through a driving endless chain 133c whereas the right drum 121A is synchronously rotated in the direction of an arrow A2 opposite the arrows A1 through a driving endless chain 133b. The endless chains 116 and a plurality of pipes 112 are moved in an ascending direction indicated by an arrow A3 between the pair of left and right drums 121A, 122A and moved in a descending direction indicated by an arrow A4 toward the pair of front and rear lower sprockets 118 after passing the pair of front and rear upper sprockets 117B. Thus, the endless chains 116 and the plurality of pipes 112 are moved in circles between the sprockets 117B, 118.

Now, the operation of the magnetic-matter removing apparatus 100B with the above structure will be explained.

When the driving motor 131 of the driving device 130 is driven, thereby rotating the output shaft 131b, the pair of front and rear upper sprockets 117B and the pair of left and right drums 121A, 122A are synchronously rotated through driving sprockets 131bb, 131bc fixed to the output shaft 131b, the driving endless chains 133b, 133c, and driving sprockets 121ba, 122ba. In the liquid 101, the plurality of pipes 112 attract the magnetic matter 102, and are then raised out of the liquid 101 by the endless chains 116 and guided to the gap between the pair of left and right drums 121A, 122A.

At the gap between the drums 121A, 122A, permanent magnets 125 arranged in the drums 121A, 122A face each of these pipes 112. The magnetic matter 102 attracted to a peripheral surface 112a of the pipe 112 is detached from the peripheral surface 112a of the pipe 112 and attracted onto peripheral surfaces 121a, 122a of the drums 121A, 122A since the magnetic force of the permanent magnets 125 is stronger than the magnetic force of a plurality of permanent magnets 111 incorporated in the pipe 112 (because of the difference in magnetic force between the plurality of permanent magnets 125 and the plurality of permanent magnets 111). Also, on the upper side of the drum 122A, after passing the gap between the pair of left and right drums 121A, 122A, the pipe 112 is in contact with the left drum 122A and facing the permanent magnet 125. In this way, the magnetic matter 102 attracted to the peripheral surface 112a of the pipe 112 can be more certainly attracted onto the peripheral surface 122a of the left drum 122A.

The magnetic matter 102 attracted to the peripheral surfaces 121a, 122a of the drums 121A, 122A is moved in the directions of rotation of the drums 121A, 122A and scraped by scrapers 141 from the peripheral surfaces 121a, 122a of the drums 121A, 122A. The magnetic matter 102 is then introduced into magnetic matter receivers 142 from opening portions 142a and discharged through discharge portions 142b to outside a tank 103 (outside the apparatus).

Thus, according to this embodiment, the pair of front and rear upper sprockets 117B, on which the pair of front and rear endless chains 116 configured to transport the plurality of pipes 112 are laid, are fixed to the shaft portion 122b of the left drum 122A. In this way, the pair of front and rear upper sprockets 117B (endless chains 116) and the left drum 122A can share the same rotational drive. Hence, the apparatus can be downsized and simplified as compared to the case where the pair of front and rear upper sprockets 117 (endless chains 116) and the left drum 122A use different rotational drives.

Fourth Embodiment

A magnetic-matter removing apparatus according to a fourth of the present invention will be explained with reference to FIGS. 4A and 4B and FIG. 5.

This embodiment involves a structure obtained by changing the transporting device and other relevant components included in the third embodiment explained above and shown in FIGS. 3A and 3B and adding a rotational-force applying device. The other features of the structure are substantially the same as those of the apparatus explained above and shown in FIGS. 3A and 3B, and the same components will be denoted by the same reference signs and overlapping explanation will be omitted when appropriate.

Figure 4A:
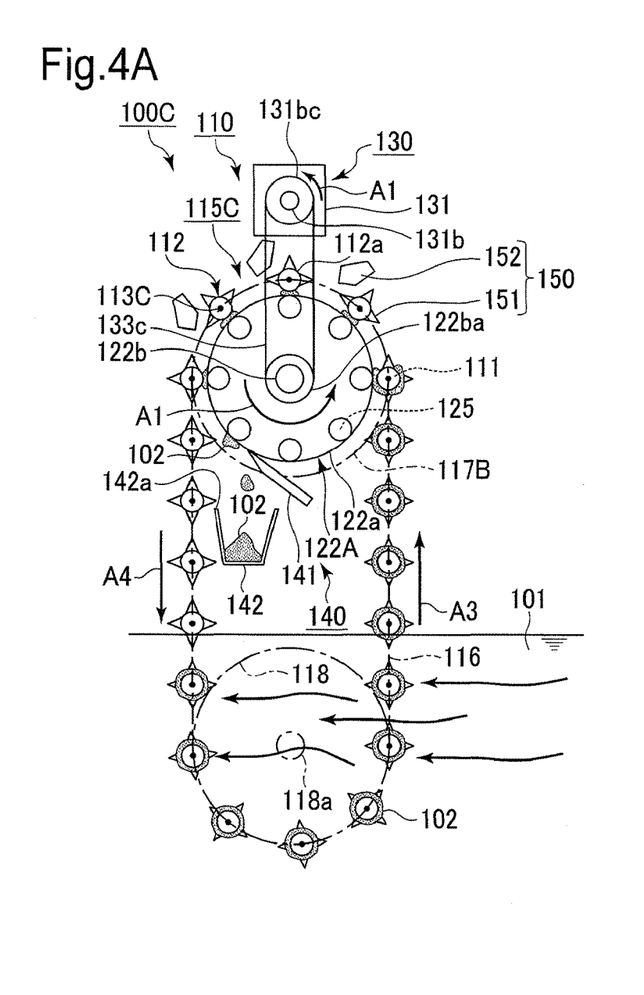
FIGS. 4A and 4B are schematic views showing a magnetic-matter removing apparatus according to a fourth embodiment of the present invention, FIG. 4A showing a front view of the magnetic-matter removing apparatus, FIG. 4B showing a side view of the magnetic-matter removing apparatus.
Figure 4B:
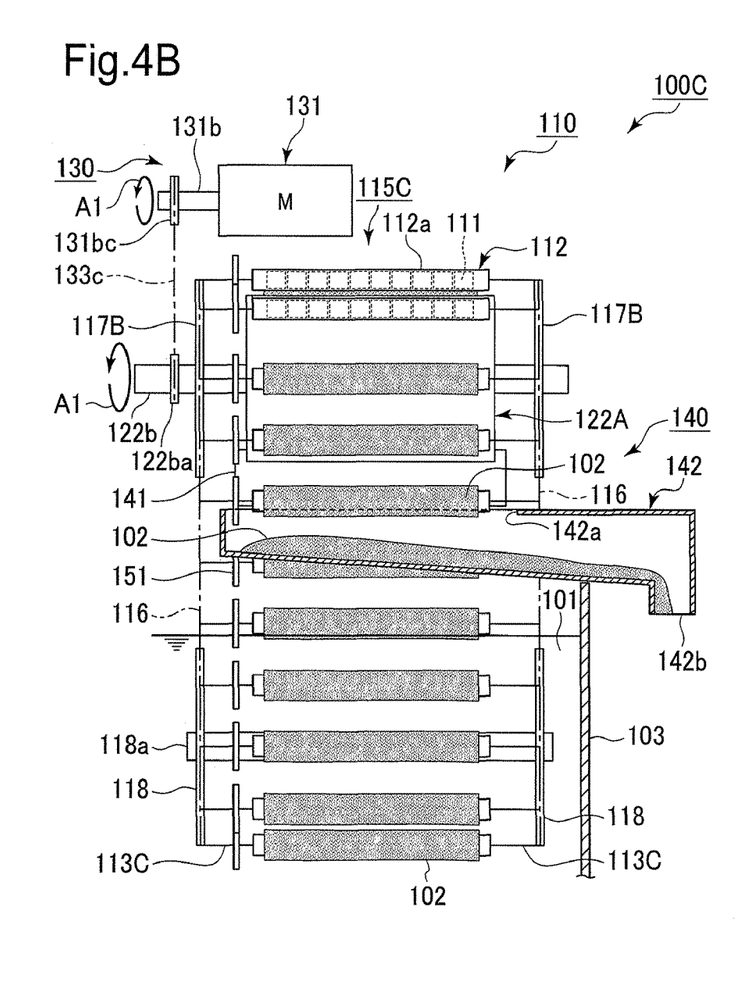
Figure 5:
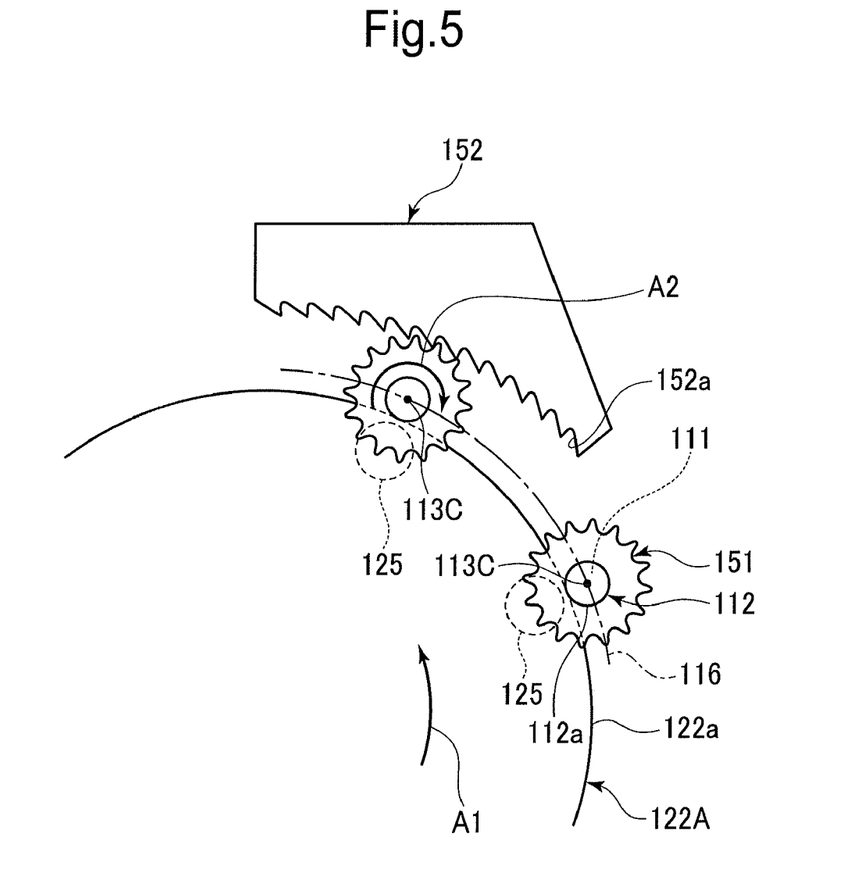
FIG. 5 is an enlarged view of a rotational-force applying device included in the magnetic-matter removing apparatus.

As shown in FIGS. 4A and 4B and FIG. 5, a magnetic-matter removing apparatus 100C according to this embodiment is an apparatus for removing a magnetic matter 102 from liquid 101, which contains the magnetic matter 102, and includes a magnetic-matter attracting instrument 110, a transporting device 115C, a drum 122A, a magnetic-matter discharging device 140, a driving device 130, and a rotational-force applying device 150.

The transporting device 115C includes endless chains 116, a pair of front and rear upper sprockets 117B, and a pair of front and rear lower sprockets 118. Also, the transporting device 115C includes supporting means 113C for supporting a plurality of pipes 112 rotatably on the endless chains 116 in place of the supporting means 113 included in the transporting device 115B mentioned above for supporting the plurality of pipes 112 on the endless chains 116. As the supporting means 113C, a conventional supporting instrument can be used.

The rotational-force applying device 150 is a device configured to rotate the pipes 112. The rotational-force applying device 150 includes gears 151 provided on the supporting means 113C and a rack 152 provided at one or more positions (three positions in the illustrated example) adjacent to the pair of front and rear upper sprockets 117B (drum 122A) and including groove portions 152*a* configured to mesh with the gears 151. As each pipe 112 is moved by the endless chains 116 and the sprockets 117B, 118, its gear 151 and the groove portions 152*a* of the rack 152 come into mesh with each other, thereby applying a rotational force to the pipe 112 in a direction A2 opposite a direction A1 of rotation of the drum 122A.

As a result, the pipe 112 is rotated while being situated in the vicinity of the drum 122A and facing permanent magnets 125 in the drum 122A, so that the magnetic matter 102 attracted to an entire peripheral surface 112*a* of the pipe 112 is detached from the entire peripheral surface 112*a* of the pipe 112 and attracted onto a peripheral surface 122*a* of the drum 122A.

Now, the operation of the magnetic-matter removing apparatus 100C with the above structure will be explained.

When a driving motor 131 of the driving device 130 is driven, thereby rotating an output shaft 131*b*, the pair of front and rear upper sprockets 117B and the drum 122A are synchronously rotated through a driving sprocket 131*bc* fixed to the output shaft 131*b*, a driving endless chain 133*c*, and a driving sprocket 122*ba*. In the liquid 101, the plurality of pipes 112 attract the magnetic matter 102, and are then raised out of the liquid 101 by the endless chains 116 and guided to the vicinity of the drum 122A.

Each of these pipes 112, when situated in the vicinity of the drum 122A, faces the permanent magnets 125, which are arranged in the drum 122A. The magnetic matter 102 attracted to the peripheral surface 112*a* of the pipe 112 is detached from the peripheral surface 112*a* of the pipe 112 and attracted onto the peripheral surface 122*a* of the drum 122A since the magnetic force of the permanent magnets 125 is stronger than the magnetic force of a plurality of permanent magnets 111 incorporated in the pipe 112 (because of the difference in magnetic force between the plurality of permanent magnets 125 and the plurality of permanent magnets 111). Also, on the upper side of the drum 122A, the pipe 112 is in contact with the drum 122A and facing the permanent magnets 125 and, in addition, rotated by the rotational-force applying device 150 in the direction A2 opposite to the direction A1 of rotation of the drum 122A. In this way, the magnetic matter 102 attracted to the peripheral surface 112*a* of the pipe 112 can be even more certainly attracted onto the peripheral surface 122*a* of the drum 122A. Thus, only the one drum 122A can be used as the target onto which to transfer the magnetic matter 102 attracted to the peripheral surface 112*a* of the pipe 112, and the apparatus can be accordingly downsized and simplified.

The magnetic matter 102 attracted to the peripheral surface 122*a* of the drum 122A is moved in the direction of rotation of the drum 122A and scraped by a scraper 141 from the peripheral surface 122*a* of the drum 122A. The magnetic matter 102 is then introduced into a magnetic matter receiver 142 from an opening portion 142*a* and discharged through a discharge portion 142*b* to outside a tank 103 (outside the apparatus).

Thus, according to this embodiment, the plurality of pipes 112 are rotatably supported on the pair of front and rear endless chains 116 with the supporting means 113C, and the rotational-force applying device 150 is further included. In this way, the magnetic matter 102 attracted to the entire peripheral surfaces 112*a* of the pipes 112 can be detached from the peripheral surfaces 112*a* of the pipes 112 and even more certainly attracted onto the peripheral surface 122*a* of the drum 122A. Hence, the magnetic matter 102 can be accordingly efficiently removed from the liquid 101, which contains the magnetic matter 102.

Figure 6:
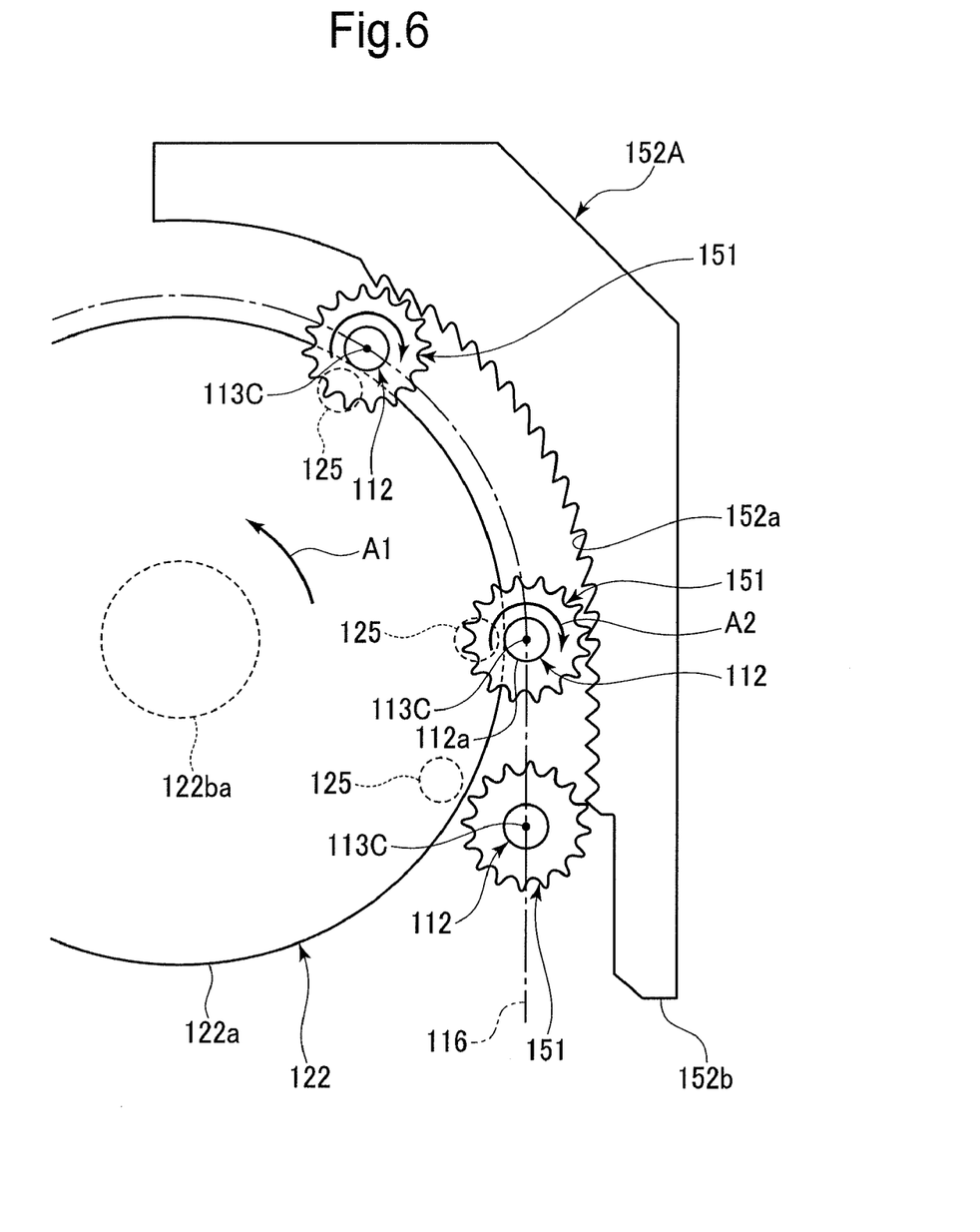
FIG. 6 is an enlarged view of another example of the rotational-force applying device.

The explanation has been given above of the case where the rack 152 of the rotational-force applying device 150 is provided above the upper side of the pair of front and rear upper sprockets 117B (drum 122A). However, as shown in FIG. 6, it is also possible to provide a rack 152A whose tip portion 152*b* is positioned below the spot where each pipe 112 comes into contact with the drum 122A. In such a case, the pipe 112 freely rotates before coming into contact with the drum 122A. Thus, the gear 151 and groove portions 152*a* of the rack 152A can smoothly come into mesh with each other. As a result, the magnetic matter 102 attracted to the peripheral surface 112*a* of the pipe 112 can be accordingly efficiently transferred onto the peripheral surface 122*a* of the drum 122A.

Meanwhile, the rack 152, 152A included in the rotational-force applying device 150 is preferably provided in such a way as to rotate the pipe 112 by 360 degrees or more while the pipe 112 is situated in the vicinity of and in contact with the drum 122A. This is because doing so can certainly transfer the magnetic matter 102 attracted to the entire peripheral surface 112*a* of the pipe 112 onto the peripheral surface 122*a* of the drum 122A.

The explanation has been given above of the magnetic-matter removing apparatus 100C provided with the rotational-force applying device 150 which includes the gears 151 and the rack 152 or the rack 152A. Alternatively, the magnetic-matter removing apparatus may be provided with a rotational-force applying device which includes toothed wheels configured to mesh with the groove portions 152*a* of the rack 152 or the groove portions 152*a* of the rack 152A in place of the gears 151.

The explanation has been given above of the magnetic-matter removing apparatus 100C provided with the rotational-force applying device 150 which includes the gears 151 and the rack 152 or the rack 152A. Alternatively, each component with reference sign 151 may be a sprocket and each component with reference sign 152 may be a chain.

Fifth Embodiment

A magnetic-matter removing apparatus according to a fifth embodiment of the present invention will be explained with reference to FIGS. 7A and 7B.

This embodiment involves a structure obtained by changing the magnetic-matter discharging device and the driving device included in the fourth embodiment explained above and shown in FIGS. 4A and 4B. The other features of the structure are substantially the same as those of the apparatus explained above and shown in FIGS. 4A and 4B, and the same components will be denoted by the same reference signs and overlapping explanation will be omitted when appropriate.

Figure 7A:
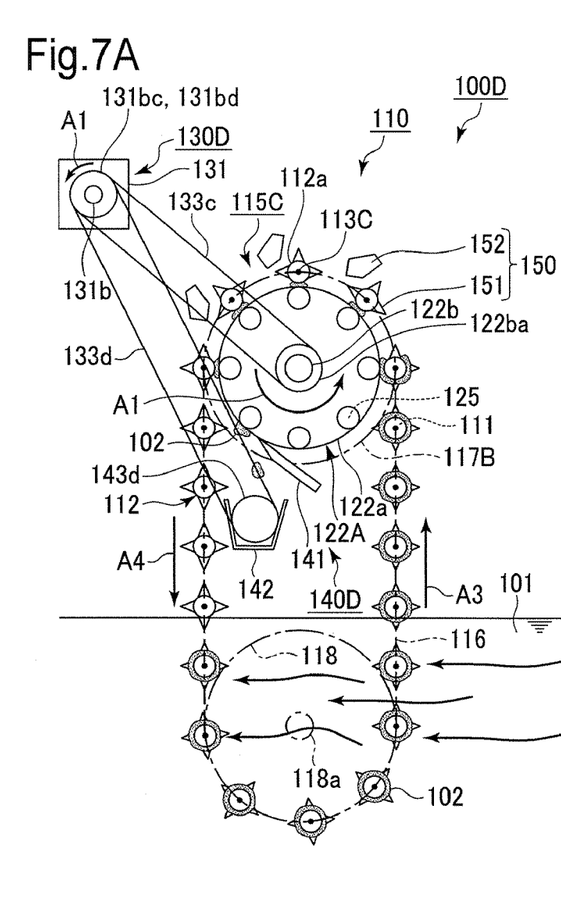
FIGS. 7A and 7B are schematic views showing a magnetic-matter removing apparatus according to a fifth embodiment of the present invention, FIG. 7A showing a front view of the magnetic-matter removing apparatus, FIG. 7B showing a side view of the magnetic-matter removing apparatus.
Figure 7B:
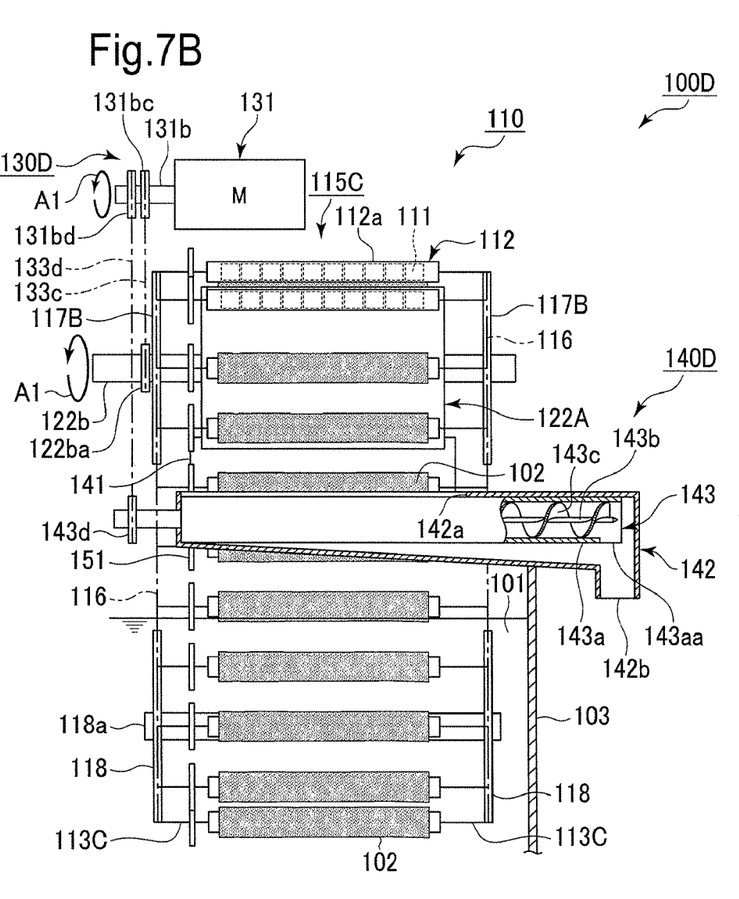

As shown in FIGS. 7A and 7B, a magnetic-matter removing apparatus 100D according to this embodiment is an apparatus for removing a magnetic matter 102 from liquid 101, which contains the magnetic matter 102, and includes a magnetic-matter attracting instrument 110, a transporting device 115C, a drum 122A, a magnetic-matter discharging device 140D, a driving device 130D, and a rotational-force applying device 150.

The magnetic-matter discharging device 140D includes a scraper 141 and a magnetic matter receiver 142 and additionally includes a screw conveyor 143 provided in the magnetic matter receiver 142.

The screw conveyor 143 includes a case 143a, a shaft portion 143b provided rotatably, a blade 143c provided on the shaft portion 143b, and a driving sprocket 143d fixed to the base end side of the shaft portion 143b. Note that the case 143a has an opening portion (not shown) at a position coinciding with an opening portion 142a of the magnetic matter receiver 142. The case 143a has a discharge portion 143aa at a position coinciding with a discharge portion 142b of the magnetic matter receiver 142.

The driving device 130D is configured to rotationally drive the drum 122A and also rotationally drive the screw conveyor 143. A driving sprocket 131bc is fixed to an output shaft 131b of a driving motor 131 included in the driving device 130D, and a driving sprocket 131bd is fixed thereto as well. A driving endless chain 133d is laid on the driving sprocket 131bd and the driving sprocket 143d of the screw conveyor 143.

Thus, when the output shaft 131b of the driving motor 131 of the driving device 130D is rotationally driven in the direction of an arrow A1, a pair of front and rear upper sprockets 117B, the drum 122A, and the screw conveyor 143 are synchronously rotated in the direction of an arrow A1 through a driving endless chain 133c, the driving endless chain 133d, a driving sprocket 122ba, and the driving sprocket 143d. Endless chains 116 and a plurality of pipes 112 are moved in an ascending direction indicated by an arrow A3 between the pair of front and rear upper sprockets 117B and a pair of front and rear lower sprockets 118 and then moved in a descending direction indicated by an arrow A4. Thus, the endless chains 116 and the plurality of pipes 112 are moved in circles between the sprockets 117B, 118.

Now, the operation of the magnetic-matter removing apparatus 100D with the above structure will be explained.

Similarly to the magnetic-matter removing apparatus 100C explained above, the pipes 112 pass through the liquid 101 to attract the magnetic matter 102 in the liquid 101, and the magnetic matter 102 attracted to peripheral surfaces 112a of the pipes 112 is transferred onto a peripheral surface 122a of the drum 122A from the peripheral surfaces 112a of the pipes 112 by magnets 125 incorporated in the drum 122A. The magnetic matter 102 attracted to the peripheral surface 122a of the drum 122A is scraped by the scraper 141 and introduced into the magnetic matter receiver 142 from the opening portion 142a.

Thereafter, with the rotation of the shaft portion 143b of the screw conveyor 143, the magnetic matter 102 in the magnetic matter receiver 142 is discharged by the blade 143c of the screw conveyor 143 to outside a tank 103 (outside the apparatus) through the discharge portion 143aa of the case 143a and the discharge portion 142b of the magnetic matter receiver 142.

Thus, according to this embodiment, the screw conveyor 143 provided in the magnetic matter receiver 142 is included, and therefore the magnetic matter 102 in the magnetic matter receiver 142 can be efficiently discharged.

Sixth Embodiment

A magnetic-matter removing apparatus according to a sixth embodiment of the present invention will be explained with reference to FIGS. 8A and 8B.

This embodiment involves a structure obtained by adding a breaker to the fourth embodiment explained above and shown in FIGS. 4A and 4B. The other features of the structure are substantially the same as those of the apparatus explained above and shown in FIGS. 4A and 4B, and the same components will be denoted by the same reference signs and overlapping explanation will be omitted when appropriate.

Figure 8A:
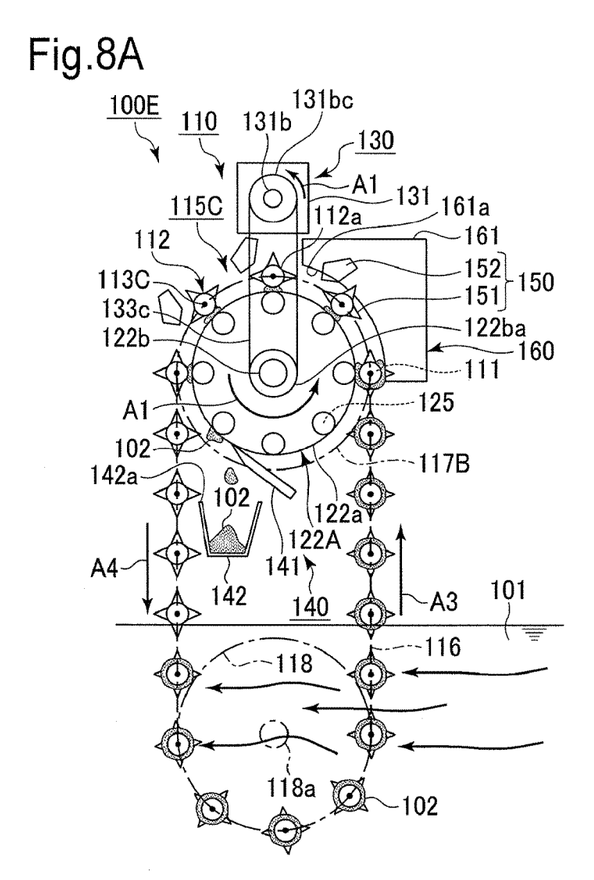
FIGS. 8A and 8B are schematic views showing a magnetic-matter removing apparatus according to a sixth embodiment of the present invention, FIG. 8A showing a front view of the magnetic-matter removing apparatus, FIG. 8B showing a side view of the magnetic-matter removing apparatus.
Figure 8B:
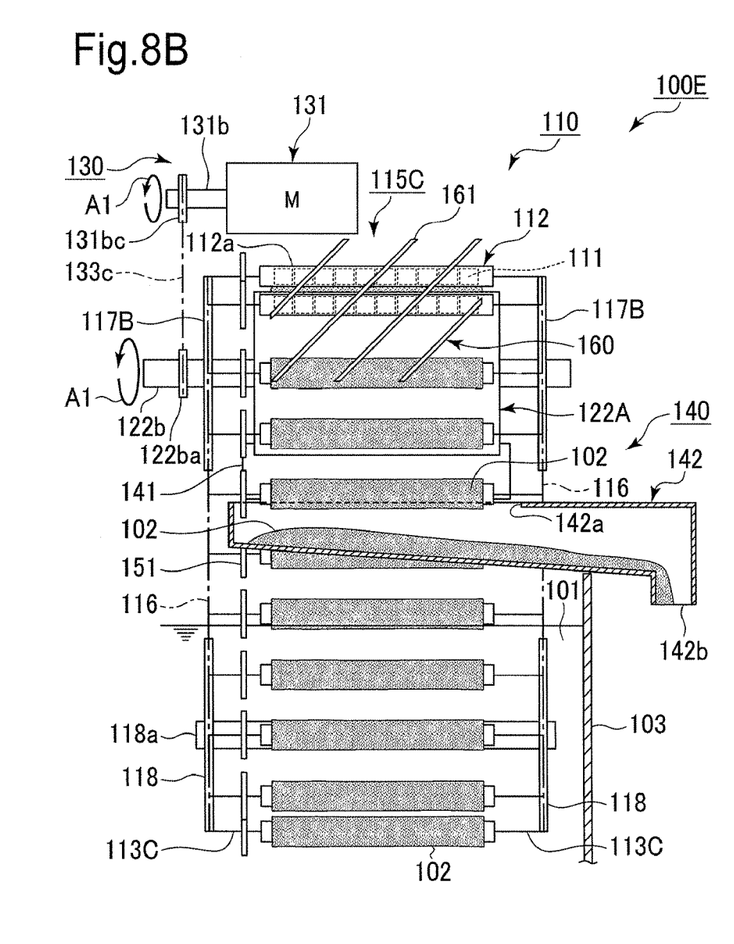

As shown in FIGS. 8A and 8B, a magnetic-matter removing apparatus 100E according to this embodiment is an apparatus for removing magnetic matter 102 from liquid 101, which contains the magnetic matter 102, and includes a magnetic-matter attracting instrument 110, a transporting device 115C, a drum 122A, a magnetic-matter discharging device 140, a driving device 130, a rotational-force applying device 150, and a breaker 160.

The breaker 160 includes one or more edges 161. The edges 161 preferably extend obliquely with respect to the direction of transport of pipes 112. The edges 161 are preferably arranged at a position around which each pipe 112 comes to the vicinity of the drum 122A. Tip end portions 161a of the edges 161 are preferably positioned in the vicinity of peripheral surfaces 112a of a plurality of pipes 112 transported by the transporting device 115C.

Now, the operation of the magnetic-matter removing apparatus 100E with the above structure will be explained.

Similarly to the magnetic-matter removing apparatus 100C explained above, the pipes 112 pass through the liquid 101 to attract the magnetic matter 102 in the liquid 101. The pipes 112 having attracted the magnetic matter 102 are pulled up out of the liquid 101 by the transporting device 115C and guided to the vicinity of the drum 122A. Each of these pipes 112 then faces permanent magnets 125 incorporated in the drum 122A.

Thereafter, being guided by a pair of front and rear upper sprockets 117B fixed to a shaft portion 122b of the drum 122A, the pipe 112 having attracted the magnetic matter 102 is moved in synchronization with the rotation of the drum 122A. In this movement, the pipe 112 passes through the breaker 160. Thus, even in a case where, for example, the liquid 101 contains a cohesive matter which is rolling oil with particularly high viscosity due to iron powder contained therein and the magnetic matter 102 containing this cohesive matter is attracted to the peripheral surface 112a of the pipe 112, the magnetic matter 102 containing the cohesive matter comes into contact with the edges 161 of the breaker 160 and breaks into pieces. In this way, the magnetic matter 102 attracted to the peripheral surface 112a of the pipe 112 can be easily transferred onto a peripheral surface 122a of the drum 122A and attracted onto the peripheral surface 122a of the drum 122A by the permanent magnets 125.

Thereafter, the magnetic matter 102 attracted to the peripheral surface 122a of the drum 122A is scraped by a scraper 141 and introduced into a magnetic matter receiver 142 from an opening portion 142a. The magnetic matter 102 in the magnetic matter receiver 142 is discharged through a discharge portion 142b to outside a tank 103 (outside the apparatus).

Thus, according to this embodiment, the breaker 160 is included, and therefore the magnetic matter 102 attracted to the peripheral surface 112a of the pipe 112 can be broken into pieces. In this way, the magnetic matter 102 attracted to the peripheral surface 112a of the pipe 112 can be smoothly transferred onto the peripheral surface 122a of the drum 122A.

Other Embodiments

The explanation has been given above of the magnetic-matter removing apparatus 100C which includes the magnetic-matter attracting instrument 110, the transporting device 115C, the one drum 122A, the driving device 130, and the rotational-force applying device 150. Alternatively, the magnetic-matter removing apparatus may include the magnetic-matter attracting instrument 110, the transporting device 115C, the one drum 122A, and the driving device 130.

The explanation has been given above of the magnetic-matter removing apparatuses 100A, 100B, 100C, 100D, 100E each of which includes the drum(s) 121A, 122A and sets of the plurality of permanent magnets 125 arranged in the vicinity of the peripheral surface(s) 121a, 122a of the drum(s) 121A, 122A. Alternatively, these magnetic-matter removing apparatuses may each be such that, on the lower side of the drum(s), the plurality of permanent magnets can be moved in a direction toward the axis of the drum.

The explanation has been given above of the case where the pipes 112 incorporating the permanent magnets 111 are included. However, the present invention is not limited to such a case and the pipes 112 themselves can be permanent magnets.

The magnetic-matterremoving apparatuses 100, 100A, 100B, 100C, 100E explained above may also employ the magnetic-matter discharging device 140D including the screw conveyor 143.

The magnetic-matter removing apparatuses 100, 100A, 100B, 100C, 100D explained above may also employ the breaker 160.

INDUSTRIAL APPLICABILITY

The present invention can efficiently remove a magnetic matter contained in liquid and can therefore be beneficially utilized in industries such as the steel industry.

REFERENCE SIGNS LIST 100, 100A, 100B, 100C, 100D, 100S MAGNETIC-MATTER REMOVING APPARATUS
101 LIQUID
102 MAGNETIC MATTER
103 TANK
110 MAGNETIC-MATTER ATTRACTING INSTRUMENT (ATTRACTING MEANS)
111 PERMANENT MAGNET
112 PIPE
113, 113C SUPPORTING MEANS
115, 115B, 115C TRANSPORTING DEVICE (TRANSPORTING MEANS)
116 PAIR OF FRONT AND REAR ENDLESS CHAINS
117, 117B PAIR OF FRONT AND REAR UPPER SPROCKETS (UPPER SPROCKETS)
118 PAIR OF FRONT AND REAR LOWER SPROCKETS (LOWER SPROCKETS)
121, 122 DRUM
121A, 122A DRUM
125 PERMANENT MAGNET
130, 130D DRIVING DEVICE (DRIVING MEANS)
131 DRIVING MOTOR
140, 140D MAGNETIC-MATTER DISCHARGING DEVICE (DISCHARGING MEANS)
141 SCRAPER
142 MAGNETIC MATTER RECEIVER
143 SCREW CONVEYOR
150 ROTATIONAL-FORCE APPLYING DEVICE (ROTATIONAL-FORCE APPLYING MEANS)
151 GEAR
152, 152A RACK
152a GROOVE PORTION
160 BREAKER (BREAKING MEANS)

The invention claimed is:

1. A magnetic-matter removing apparatus for removing a magnetic matter from liquid, which contains the magnetic matter, comprising:
    an attractor that attracts the magnetic matter with a magnetic force;
    a transporter that transports the attractor in circles between inside the liquid and above the liquid;
    at least one drum arranged above the liquid, the at least one drum including an inside drum provided inside a loop defined by the transporter, the at least one drum having a magnetic force stronger than the magnetic force of the attractor, and configured to detach the magnetic matter attracted to the attractor from the attractor and attract the magnetic matter;
    a discharger that scrapes the magnetic matter attracted to the at least one drum and discharges the magnetic matter to outside the magnetic-matter removing apparatus; and
    a driver that drives the transporter and the at least one drum, wherein
    the transporter includes two chains laid on lower sprockets arranged in the liquid and upper sprockets arranged above the liquid,
    the two chains are spaced in an axial direction of the lower sprockets and the upper sprockets,
    the two chains form the loop including a first semicircular region formed in a portion in which the two chains are engaged with the lower sprockets and having a center on a rotational axis of one of the lower sprockets, and a second semicircular region formed in a portion in which the two chains are engaged with the upper sprockets and having a center on a rotation axis of one of the upper sprockets, and one linear region connecting the first semicircular region and the second semicircular region to each other, and
    the attractor and the inside drum are disposed between the two chains in the axial direction,
    the inside drum has a diameter smaller than a diameter of the lower sprockets and a diameter of the upper sprockets.

2. The magnetic-matter removing apparatus according to claim 1, wherein
    the attractor includes at least one pipe supported on the two chains and a permanent magnet arranged in the at least one pipe.

3. The magnetic-matter removing apparatus according to claim 1, wherein a direction in which the transporter transports the attractor in circles is same as a rotating direction of the inside drum.

4. The magnetic-matter removing apparatus according to claim 2, wherein
the at least one pipe comprises a plurality of pipes, and
the at least one drum includes a permanent magnet arranged to face each of the plurality of pipes when the driver drives the at least one drum and the two chains, and thereby brings the plurality of pipes to a vicinity of the at least one drum.

5. The magnetic-matter removing apparatus according to claim 4, wherein the upper sprockets are provided on a shaft portion of the inside drum.

6. The magnetic-matter removing apparatus according to claim 5, wherein the plurality of pipes and the inside drum come into contact with each other on an upper side of the inside drum.

7. The magnetic-matter removing apparatus according to claim 2, wherein
the at least one drum further includes an outside drum provided outside the loop defined by the transporter, and
the inside drum and the outside drum are arranged to face each other such that the at least one pipe, supported on the two chains, is interposed between the inside and outside drums.

8. The magnetic-matter removing apparatus according to claim 1, wherein the discharger includes:
a scraper configured to scrape the magnetic matter attracted to the at least one drum;
a magnetic matter receiver configured to receive the magnetic matter scraped by the scraper; and
a screw conveyor configured to discharge the magnetic matter received by the magnetic matter receiver to outside the magnetic-matter removing apparatus, the screw conveyor being driven by the driver.

9. The magnetic-matter removing apparatus according to claim 1, further comprising:
a breaker that breaks the magnetic matter attracted to the attractor into pieces.

10. The magnetic-matter removing apparatus according to claim 7, wherein
the inside drum and the outside drum are rotated in an opposite direction.

11. A magnetic-matter removing apparatus for removing a magnetic matter from liquid, which contains the magnetic matter, comprising:
an attractor that attracts the magnetic matter with a magnetic force;
a transporter that transports the attractor in circles between inside the liquid and above the liquid;
at least one drum arranged above the liquid, the at least one drum having a magnetic force stronger than the magnetic force of the attractor, and configured to detach the magnetic matter attracted to the attractor from the attractor and attract the magnetic matter;
a discharger that scrapes the magnetic matter attracted to the at least one drum and discharges the magnetic matter to outside the magnetic-matter removing apparatus; and
a driver that drives the transporter and the at least one drum, wherein
the attractor includes a pipe supported on the transporter and a magnet arranged in the pipe,
the pipe is rotatably supported on the transporter such that the pipe is rotatable about an axial center of said pipe, and
the magnetic-matter removing apparatus further comprises a rotational-force applier that causes the pipe to rotate about the axial center of said pipe while the pipe is facing the at least one drum.

12. The magnetic-matter removing apparatus according to claim 11, wherein the rotational-force applier rotates the pipe in a direction opposite a direction of rotation of the at least one drum.

13. The magnetic-matter removing apparatus according to claim 12, wherein the rotational-force applier includes:
a gear or a sprocket provided on a supporter that supports the pipe rotatably on two chains; and
a rack provided with a groove portion or a chain configured to mesh with the gear or the sprocket.

14. The magnetic-matter removing apparatus according to claim 13, wherein the groove portion of the rack or the chain is arranged to mesh with the gear or the sprocket before the at least one drum and said pipe come into contact with each other.

15. A magnetic-matter removing method for removing a magnetic matter from liquid, which contains the magnetic matter, comprising:
attracting the magnetic matter with a magnetic force from an attractor;
transporting the attractor in circles between inside the liquid and above the liquid with a transporter;
detaching the magnetic matter attracted to the attractor from the attractor and attracting the magnetic matter with at least one drum arranged above the liquid, the at least one drum having a magnetic force stronger than the magnetic force of the attractor; and
scraping the magnetic matter attracted to the at least one drum and discharging the magnetic matter with a discharger, wherein
the attractor includes a pipe supported on the transporter and a magnet arranged in the pipe,
the pipe is rotatably supported on the transporter such that the pipe is rotatable about an axial center of the pipe, and
the method further comprises applying a rotational-force to the pipe to rotate about the axial center of the pipe while the pipe is facing the at least one drum.

* * * * *